United States Patent
Dysvik et al.

(10) Patent No.: US 9,869,785 B2
(45) Date of Patent: Jan. 16, 2018

(54) SYSTEMS AND METHODS FOR SPEED-ADJUSTABLE MODEL NAVIGATION

(71) Applicant: Schlumberger Technology Corporation, Sugar Land, TX (US)

(72) Inventors: Bjarte Dysvik, Royneberg (NO); Dmitriy Gennadyevich Repin, Katy, TX (US); Edo Vincent Hoekstra, Hafrsfjord (NO); Nader Salman, Tananger (NO); Qiang Fu, Stavanger (CN); Guido van der Hoff, Tananger (NO); Olesya Zimina, Hafrsfjord (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 336 days.

(21) Appl. No.: 14/538,481

(22) Filed: Nov. 11, 2014

(65) Prior Publication Data

US 2015/0135143 A1    May 14, 2015

Related U.S. Application Data

(60) Provisional application No. 61/902,835, filed on Nov. 12, 2013.

(51) Int. Cl.
*G06F 3/00* (2006.01)
*G06F 3/048* (2013.01)
*G01V 1/34* (2006.01)

(52) U.S. Cl.
CPC .......... *G01V 1/345* (2013.01); *G01V 2210/64* (2013.01)

(58) Field of Classification Search
None
See application file for complete search history.

(56) References Cited

U.S. PATENT DOCUMENTS

| 5,153,858 A | 10/1992 | Hildebrand |
| 5,548,694 A | 8/1996 | Frisken Gibson |

(Continued)

FOREIGN PATENT DOCUMENTS

| JP | 2008009723 A | 1/2008 |
| WO | 2012102716 A1 | 8/2012 |

(Continued)

OTHER PUBLICATIONS

International Search Report and Written Opinion issued in PCT/US2014/065126 on Feb. 17, 2015, 12 pages.

*Primary Examiner* — Yongjia Pan
(74) *Attorney, Agent, or Firm* — Alec J. McGinn

(57) ABSTRACT

Systems and methods for speed-adjustable model navigation are provided. In aspects, a model platform includes a model engine and a speed tool that operates with the model engine to generate a graphical view of a geological model. Various features of the geological object may be encoded or reflected in the geological model, including the composition, pressure, temperate, structure, fracture lines, and other aspects of a hydrocarbon deposit, cavity, or other geological structure. The user may operate the speed tool to examine the histogram of color or intensity of the pixels or voxels of regions of the model view, and set a speed curve to control how quickly or slowly a cursor or other control may move through or traverse a region, based on the color, intensity, or other value. Regions of interest may be explored more efficiently and accurately.

20 Claims, 6 Drawing Sheets

(56) References Cited

U.S. PATENT DOCUMENTS

| | | | |
|---|---|---|---|
| 6,456,292 B1* | 9/2002 | Chan | G06T 11/001 |
| | | | 345/589 |
| 6,463,387 B1 | 10/2002 | Runnestrand et al. | |
| 6,690,820 B2 | 2/2004 | Lees et al. | |
| 6,823,266 B2 | 11/2004 | Czernuszenko et al. | |
| 7,031,842 B1 | 4/2006 | Musat et al. | |
| 7,613,335 B2* | 11/2009 | McLennan | G06K 9/4652 |
| | | | 382/128 |
| 8,427,481 B1* | 4/2013 | Schileru | G06F 3/04815 |
| | | | 345/440 |
| 8,564,623 B2* | 10/2013 | Cohen | G02B 21/367 |
| | | | 345/634 |
| 8,565,514 B2 | 10/2013 | Rohlf et al. | |
| 9,280,257 B2* | 3/2016 | Fitzmaurice | G06F 3/04815 |
| 2004/0175058 A1* | 9/2004 | Jojic | G06F 17/30259 |
| | | | 382/305 |
| 2004/0233222 A1 | 11/2004 | Lee et al. | |
| 2010/0171740 A1 | 7/2010 | Andersen et al. | |
| 2011/0002194 A1* | 1/2011 | Imhof | G01V 1/32 |
| | | | 367/53 |
| 2011/0054857 A1 | 3/2011 | Moguchaya | |
| 2011/0171612 A1* | 7/2011 | Gelinske | G09B 9/08 |
| | | | 434/35 |
| 2012/0068927 A1 | 3/2012 | Poston et al. | |
| 2012/0072611 A1* | 3/2012 | Kandekar | H04N 7/17318 |
| | | | 709/231 |
| 2012/0249539 A1* | 10/2012 | Bhattacharya | G06T 19/003 |
| | | | 345/419 |
| 2013/0129308 A1* | 5/2013 | Karn | H04N 5/772 |
| | | | 386/230 |
| 2013/0158877 A1 | 6/2013 | Bakke et al. | |
| 2015/0049085 A1 | 2/2015 | Dysvik et al. | |

FOREIGN PATENT DOCUMENTS

| | | |
|---|---|---|
| WO | 2013144880 A1 | 10/2013 |
| WO | 2015/057607 A1 | 4/2015 |

* cited by examiner

SYSTEMS AND METHODS FOR SPEED-ADJUSTABLE MODEL NAVIGATION

CROSS REFERENCE TO RELATED APPLICATIONS

This application claims priority to U.S. Provisional Patent Application Ser. No. 61/902,835, filed Nov. 12, 2013. The entirety of this provisional patent application is incorporated by reference herein.

BACKGROUND

In geology-related sciences, computer-generated models of geological formations or objects, such as oil fields or deposits, or others are employed. Generally, such geological models present the user with a graphical view of a subterranean well, borehole, cavity, channel, formation, fractures, etc.

The geological model may present the user with a large amount of structural detail which extends over a fairly large physical range, such as the model depiction of a well that extends for hundreds of meters or more. The view of that model may encode many details that are shown in terms of gradients or differences in compositions, densities, temperatures, pressures, porosity, and/or other physical or environment features. In some cases, those gradients or fields may be show as color or brightness differences in the model view.

When an analyst or another user wishes to traverse the view to explore various features, look for faults or other anomalies, or perform other modeling tasks, the user may scroll, pan, or otherwise move through the relatively large graphical range of the presented model, in which many areas may be of little or no interest to the user, but which still require the user to navigate through those comparatively low-information regions. This process of navigation may therefore be cumbersome or inconvenient for the user, since a significant amount of manual navigation may be required, and the user has no way to speed up the travel through regions that are of comparatively low interest in order to arrive at more interesting regions.

SUMMARY

Systems and methods for speed-adjustable model navigation are provided. In aspects, a model platform includes a model engine and a speed tool that operates with the model engine to generate a graphical view of a geological model. Various features of the geological object may be encoded or reflected in the geological model, including the composition, pressure, temperate, structure, fracture lines, and other aspects of a hydrocarbon deposit, cavity, or other geological structure. The user may operate the speed tool to examine the histogram of brightness, intensity, color, etc. of the pixels or voxels of regions of the model view, and set a speed curve to control how quickly or slowly a cursor or other control may move through or traverse a region, based on the color, intensity, or other value. Regions of interest may be explored more efficiently and accurately.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Reference will now be made in detail to embodiments of the present teachings, which are illustrated in the accompanying drawings. Where possible the same reference numbers will be used throughout the drawings to refer to the same or like parts.

Figure 1:
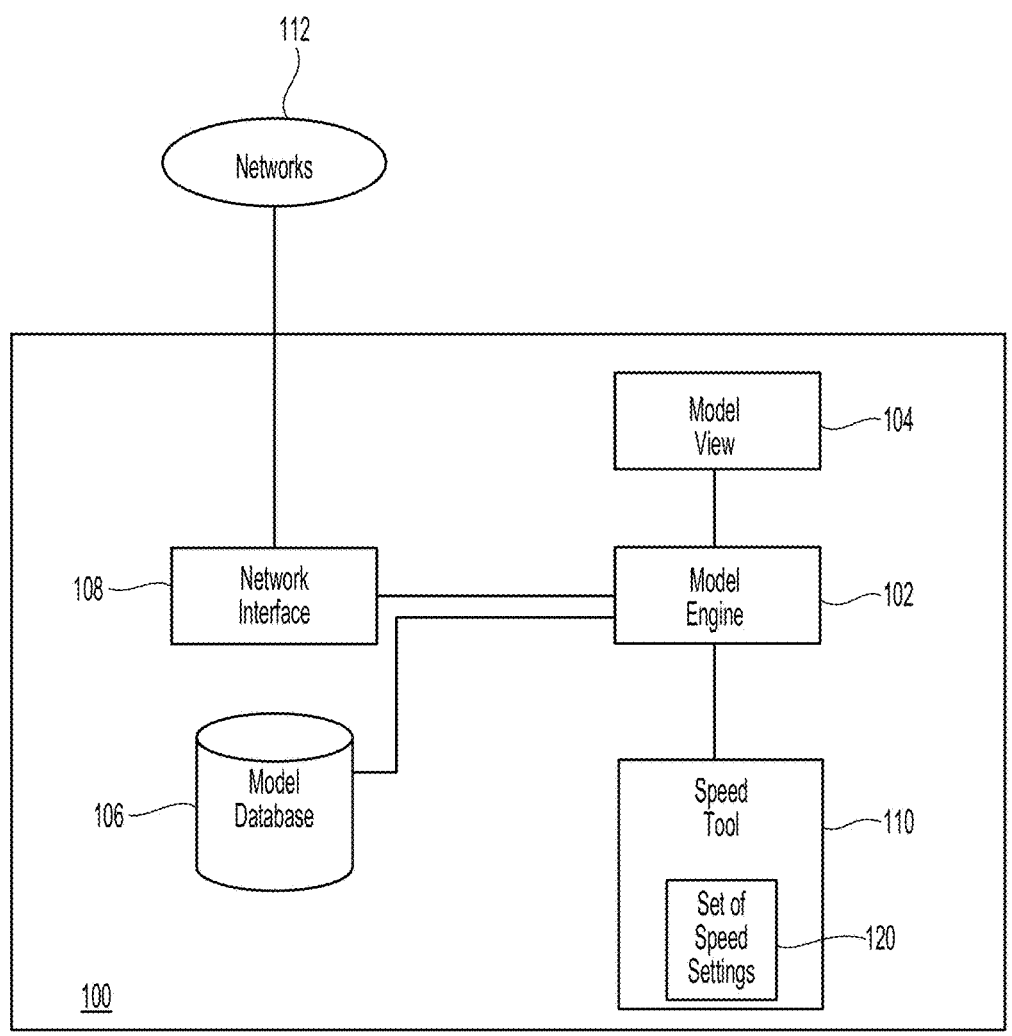
FIG. 1 illustrates an overall network in which systems and methods for speed-adjustable model navigation may be implemented, according to various embodiments.

FIG. 1 illustrates an overall modeling platform 100 in which systems and methods for speed-adjustable model navigation may operate, according to an embodiment. The modeling platform 100 may, in implementations, and in general terms, be used to analyze, edit, modify, and/or otherwise operate on a software-based model or representation of a geological formation or structure. One type of geological formation or structure that may be analyzed by the modeling platform 100 is a well, such as an oil or gas well. Other examples may include formation features such as reservoirs, faults, other geological characteristics, and/or the like. It will however be appreciated that other types of geological structures may be analyzed using the modeling platform 100, and moreover that other types of structures or objects, including ones which are not geological or seismological in nature, may also be analyzed or edited using the inventive platforms and techniques herein.

In terms of configuration, in aspects as shown, the modeling platform 100 may illustratively contain a variety of hardware, software, communications, and other resources, including a model engine 102. The model engine 102 may be or include one or more software applications and/or services directed to the encoding or representation of an underlying geological structure, such as a hydrocarbon deposit contained within an underground and/or undersea structure. The model engine 102 may capture various attributes of the geological structure, such as size, depth, volume, composition, pressure, temperature, porosity, and/or other features, and present those features to an analyst or other user via a model view 104. The model view 104 may be or include a graphical, pictorial, videographic, and/or other representation of the model of the geological structure or other object of study. In implementations, the model view 104 may show different features or characteristics of the underlying structure in various ways, including, for instance, the encoding of composition of the structure using different colors, brightness values, and/or intensities of regions of the model view 104, for example to show rock formations having different densities. In various implementations, the model view 104 may be or include a two-dimensional (2D) representation of the underlying structure, or may be or include a three-dimensional (3D) representation of the underlying structure. The model view 104 may be displayed on a computer display and/or other output device or devices.

The modeling platform 100 may also, as shown, include various data storage, logic, and network resources, including a model database 106 for storing data related to the model used in model engine 102, as well as other information. The model engine 102 may likewise communicate with a network interface 108, such as an Ethernet or other wired or wireless connection, to access one or more networks 112, such as the internet and/or other public or private networks to access data, services, and/or otherwise carry out the analysis of geological structures or other objects consistent with the teachings herein.

According to implementations, the modeling platform 100 may likewise include a speed tool 110 to configure and manipulate a set of speed settings 120 to adjust the rate at which a user navigates or traverses the model view 104. The user may navigate or traverse the model view 104 using various inputs or interfaces, such as a cursor operating via a graphical user interface (GUI), although it will be appreciated that other techniques, such as keyboard inputs, touchpad inputs, speech commands, and/or others may be used. In general, the user of the modeling platform 100 may configure or adjust the set of speed settings 120 using the speed tool 110 to create automatic adjustments to movement in the model view 104, and in particular, to allow the speeding up or slowing down of travel so that the user may view and explore regions of the model view 104 with greater control, convenience, or accuracy. In some instances, for example, the model view 104 may display a model or representation of a geological structure contain a variety of features, while wishing to focus on features such as the location of a fracture or break in a layer, dome, conduit, or other subterranean structure.

In instances, those features of interest may be encoded or reflected by pixels (2D values) or voxels (3D values) which may be shown in lighter colors, and/or greater intensities or brightness settings than the, e.g., darker areas of less interest. In order to arrive at the regions of interest containing fractures or other features, the speed tool 110 may be configured to cause the cursor or other navigation point to travel more quickly through pixel/voxel values representing darker areas, while traveling more slowly or slowing down when entering regions containing pixel/voxel values representing lighter or brighter areas. The set of speed settings 120 may control the rate at which the cursor travel or other movement changes while traversing regions whose displayed values reflect different ranges or types of values. In implementations, the attributes, characteristics, and/or other values of the regions or display fields of the model view 104 may be set by the user, to allow the user to tune or control the rate at which navigation toward, or away from, areas of interest is performed. It will be appreciated that the example of the areas of interest being lighter and the areas of less interest being darker is just one example display convention among many contemplated. Other conventions may include the reverse, with the areas of interest being darker and the areas of less interest being lighter. Yet other conventions will be readily apparent from the present disclosure.

Figure 2:
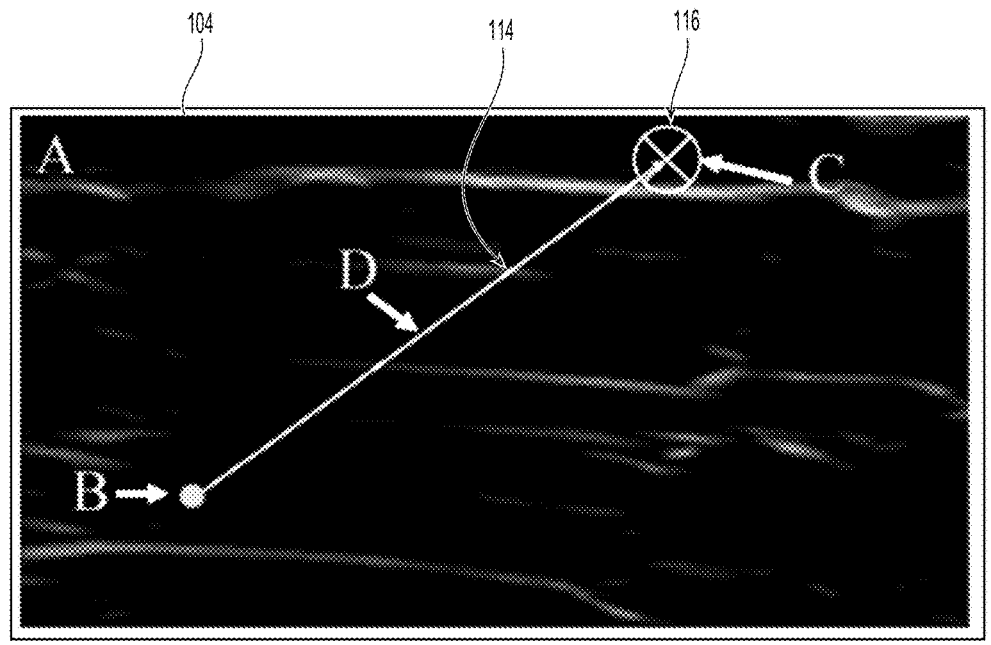
FIG. 2 illustrates a graphical view of a geological model, according to an embodiment.

More specifically and as for instance illustrated in FIG. 2, a user may be presented with a 2D view of a seismological or geological structure, in which the user the user desires to travel from a first point (B) to a target point 116 (C), represented by a crosshair. The user may thus navigate or travel a line of movement 114 to arrive at the target point 116, along which line of movement 114 pixels of different values may be encountered. In implementations as shown, the user may wish to move more quickly through regions or areas containing dark pixels, while slowing down in areas containing lighter pixels.

Figure 3:
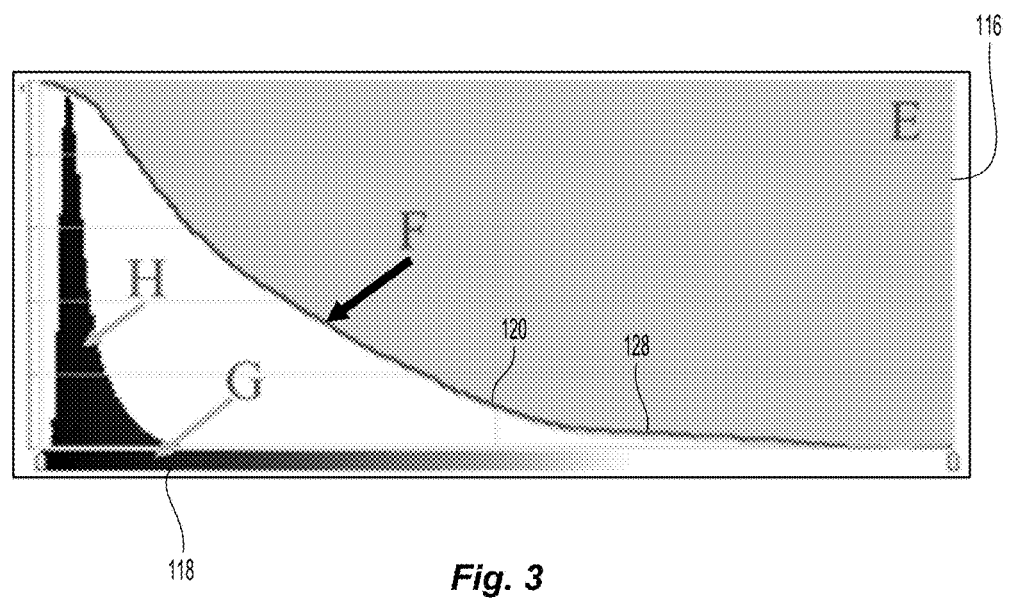
FIG. 3 illustrates aspects of a speed tool that may be used in various embodiments.

To cause that effect, the user may operate the speed tool 110 to manipulate the set of speed settings 120. As shown in FIG. 3, the set of speed settings 120 may be in the form of a histogram 118 and a speed curve 128. The histogram 118 may show the values of the pixels in the model view 104 in a series of bins or values representing total counts or values of pixel brightness, color, intensities, or other characteristics. The user may use a cursor or other input to select or trace the speed curve 128, to indicate the speed at which the user wishes to navigate regions whose pixels have corresponding bright or darker values. The user may select the speed curve 128 to cause a greatest speed of movement or motion for the darkest pixels, while decreasing the speed as pixels grow later, in a tapering fashion. For example, a user may select to reduce the speed of movement to zero when encountering a pixel having a white or other maximum value, so that the cursor or other movement point stops at that value. While the speed curve 128 is illustrated as having a gradually decreasing slope, other shapes, inclinations, or tapers may be used.

In addition, while the speed curve 128 and associated set of speed settings 120 are illustrated in terms of adjustable speeds over a line of movement 114 set by a user, in implementations, either or both of the line of movement 114 or set of speed settings 120 including speed curve 128 may be set automatically, for instance by the model view 104 and/or other logic. Those automatic settings may, for instance, including default settings, settings determined by a distribution of the histogram 118, and/or using other techniques.

Figure 4:
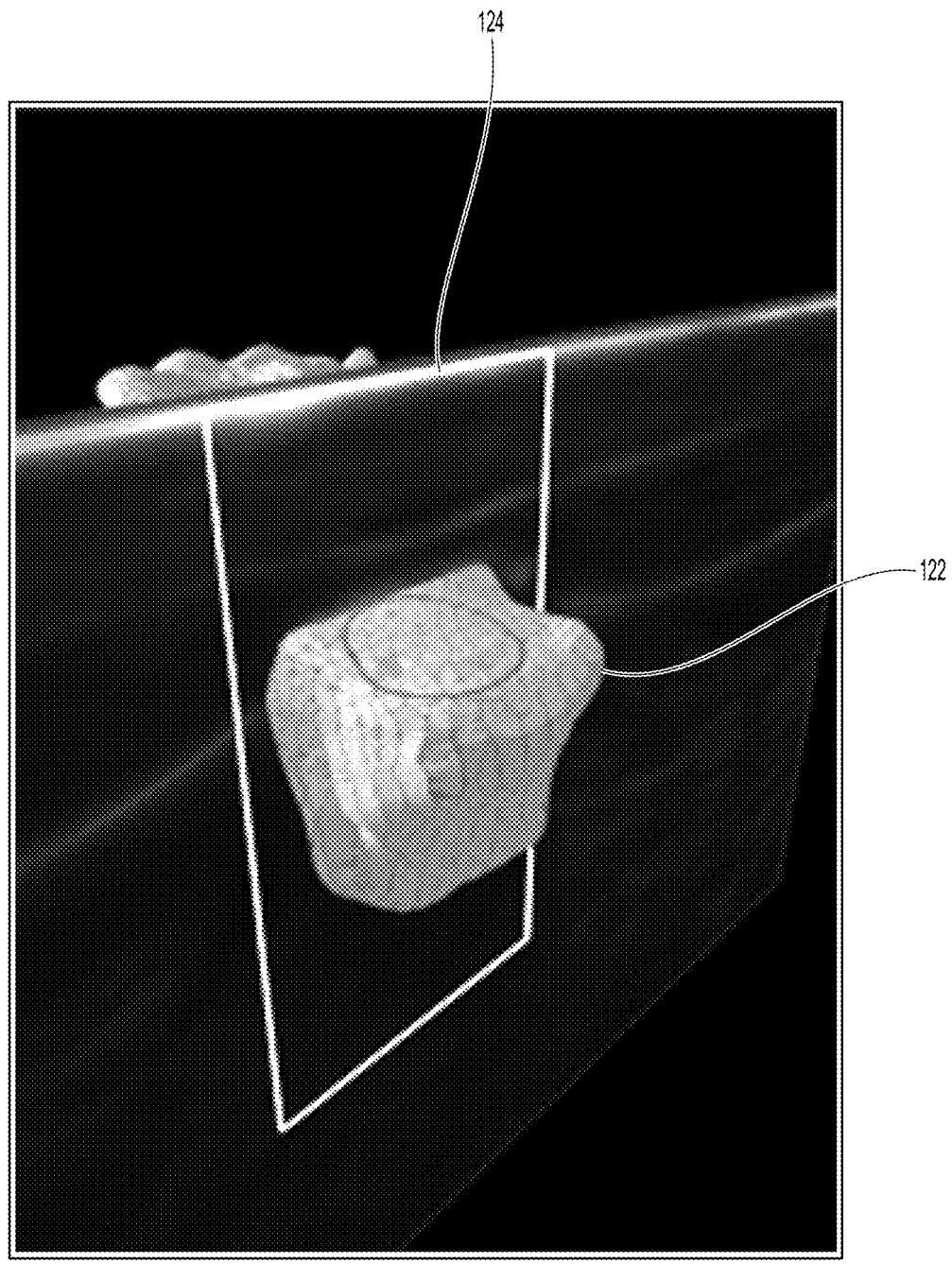
FIG. 4 illustrates a graphical view of a geological model, according to an embodiment.
Figure 5:
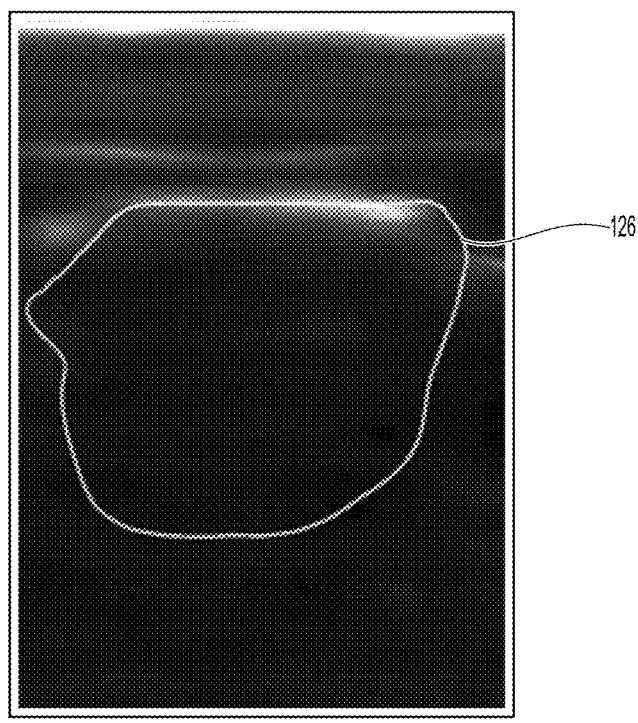
FIG. 5 illustrates a graphical view of a geological model including taking a slice of a 3D structure, according to an embodiment.
Figure 6:
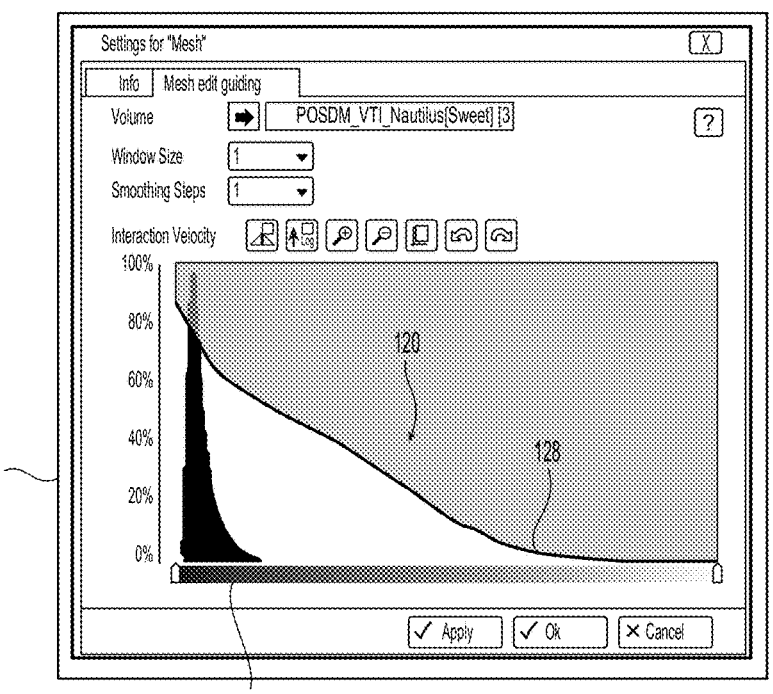
FIG. 6 illustrates a speed tool of the system, according to an embodiment.

Further, the set of speed settings 120 and other controls on the model view 104 may be used in the case of 3D models, representations, or views. As shown in FIG. 4, for example, an analyst or other user may operate the model view 104 to analyze and/or edit a 3D formation 122, through which the model view 104 takes a 2D slice 126 (shown in FIG. 5) through plane 124 to examine different plane views or 2D characteristics of the 3D formation 122. The 3D formation 122 may reflect a computer-generated triangle mesh, or other representation of a seismic or geological object. To traverse the 3D formation and/or its 2D slice 126, the user may, as illustrated in FIG. 6, operate the speed tool 110 to set a speed curve 128, again illustratively based on a histogram 118.

In the illustrative 3D formation 122 shown, the upper part of the 3D formation 122 reflects an area in which vertices of the mesh are moved up and down to fit a signal from a seismic 3D sample. The 3D formation 122 may include a circle around the upper vertices, which may be selected by the user. The vertices contained or bounded in the circle may be made to move up or down based on a speed a value that is read from the speed tool 110. Those varying speed values may be based on the value of the voxels in the region of the 3D formation 122 and/or 2D slice 126, based on the speed curve 128 set by the user (or alternatively, automatically set by the model view 104 or using other logic). The model view 104 will thus move vertices located in the upper crown or top of the 3D formation 122 more quickly in black (low value) areas, and slower in grey or other lighter regions. Vertex movement may be set to go to zero in white areas, so that navigation stops there. While 3D movement in implementations shown is described in terms of the movement of a set of vertices in a 3D mesh to fit or "cap" the upper boundary of the 3D formation 122, it will be understood that other types or directions of movements in 3D space are possible.

Figure 7:
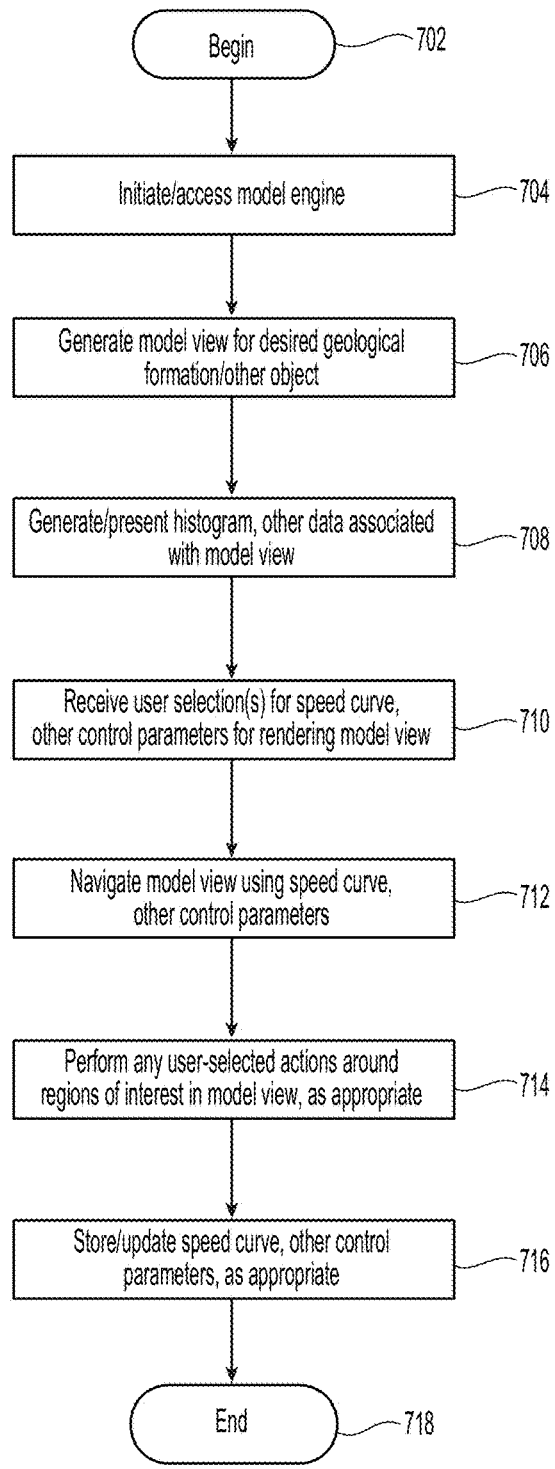
FIG. 7 illustrates a flowchart of processing that may be used in speed-adjustable model navigation, according to an embodiment.

FIG. 7 illustrates a flowchart of geological modeling, image processing, and other processing that may be performed in systems and methods for speed-adjustable model navigation, according to aspects. In 702, processing may begin. In 704, an analyst or other user may initiate and/or access the model engine 102, such as by initiating or accessing an application on a workstation or other client, and/or by initiating and/or accessing the model engine 102 and/or related services via a cloud-based network, or other network. In 706, the model engine 102 may generate a model view 104 of a desired or selected geological structure, and/or other object. The model view 104 may, again, be or include a 2D and/or 3D representation of the geological structure and/or other formation or object.

In 708, the model engine 102 and/or other logic may generate and/or present a histogram 118 and/or other data associated with the model view 104. In aspects, the histogram 118 and/or other data may be presented via the speed tool 110, and/or through other screens, gadgets, or interfaces. In 710, the model engine 102 may receive user selection(s) for the set of speed settings 120, which may be or include a speed curve as shown, to control the speed of movement or navigation depending on the brightness, color, and/or other characteristic of the pixel or voxel at which the current model view 104 is located. It may be noted that in addition to or instead of manual user selection or input of the set of speed settings 120 or related data, the model engine 102 may be configured to automatically generate values for the set of speed settings 120, such as by using default values, calculating or normalizing a distribution of the histogram bins, and/or using other "smart" techniques.

In 712, the user may use the model engine 102 to navigate or traverse the model view 104 based on the set of speed settings 120, which may again include a speed curve or other parameters. Thus in merely illustrative cases as shown, the speed of the cursor or other graphical control element may be made to increase while the cursor is located in regions with lower (or darker) pixel/voxel values, and made to decrease while the cursor is located in regions with higher (or lighter) pixel/voxel values. In 714, the model engine 102 may perform any user-selected actions around or associated with regions of interest in the model view 104, as appropriate. Thus, and merely for example, the user may invoke a zoom tool to view the current location in the model view 104 in greater detail, or may use the same or similar tool to zoom out and gain a wider perspective of the model view 104. In other cases, the user may for instance click or otherwise activate a pixel/voxel to view attributes of the currently selected location, to see e.g. a pop-up display of the depth, pressure, temperature, etc. of the geological structure at that point or location. Other actions may be taken.

In 716, the model engine 102 and/or other logic may store the set of speed settings 120 including any speed curve, as well as other control parameters or other data, as appropriate, for instance, to allow the analyst or other user to continue analyzing the data or exploring the model view 104 at a later time. In 718, processing may repeat, return to a prior processing point, jump to a further processing point, or end.

Figure 8:
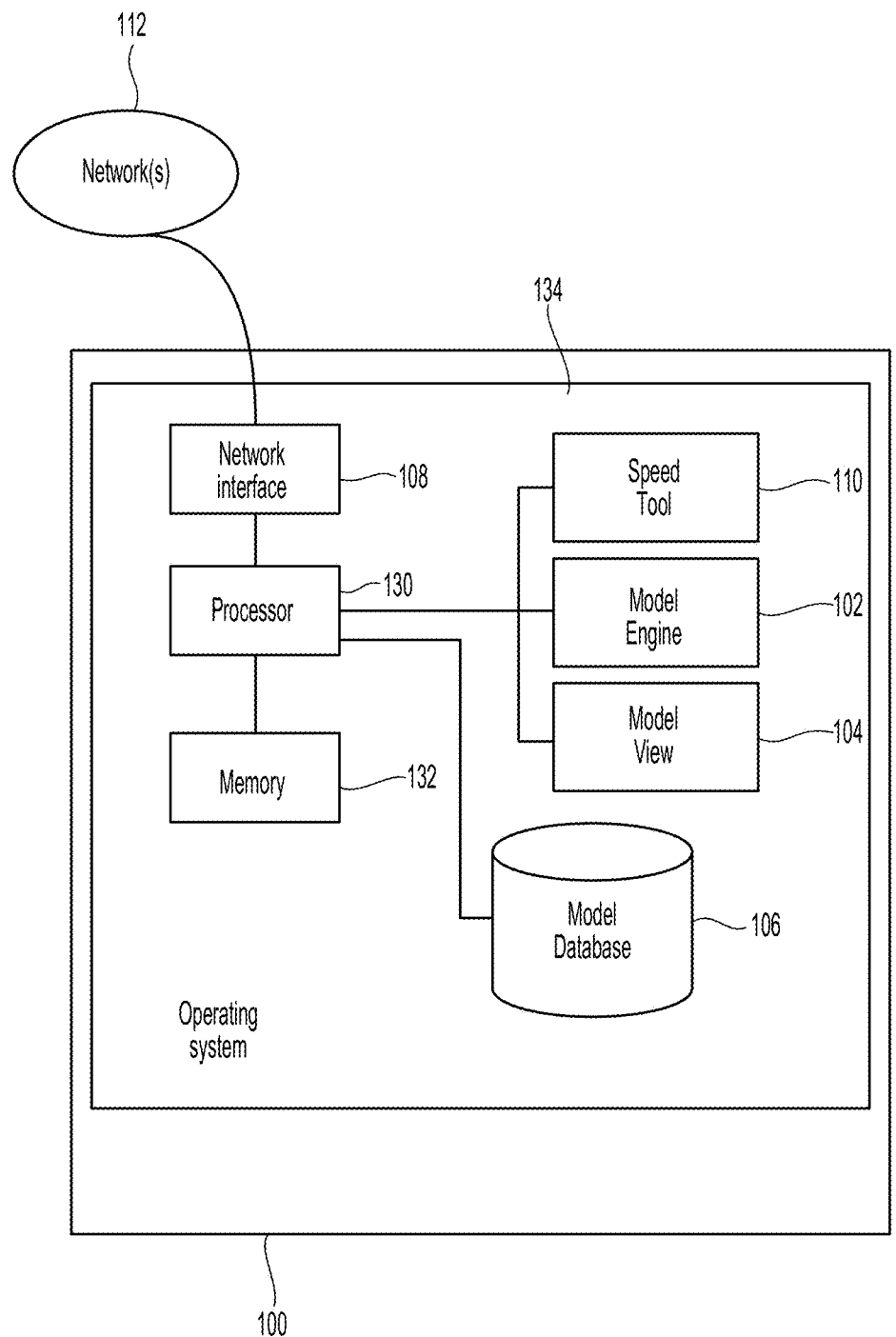
FIG. 8 illustrates a schematic view of hardware, software, and other resources that may be used in speed-adjustable model navigation, according to various embodiments.

FIG. 8 illustrates various hardware, software, and other resources that may be used in implementations of speed-adjustable model navigation, according to embodiments. In embodiments as shown, the modeling platform 100 may comprise a platform including processor 130 communicating with memory 132, such as electronic random access memory, operating under control of or in conjunction with an operating system 134. The processor 130 in embodiments may be incorporated in one or more local or remote servers, clusters, and/or other computers or hardware resources, and/or may be implemented using cloud-based resources. The operating system 134 may be, for example, a distribution of the LINUX® operating system, the UNIX® operating system, the Microsoft WINDOWS® family of operating systems, or other open-source or proprietary operating system or platform. The processor 130 may communicate with the model database 106, such as a database stored on a local hard drive or drive array, to access or store data related to the geological model, the set of speed settings 120, and/or subsets of selections thereof, along with other content, media, or other data. The processor 134 may further communicate with network interface 108, such as an Ethernet or other wired or wireless data connection, which in turn communicates with the one or more networks 112, such as the Internet or other public or private networks. The processor 130 may, in general, be programmed or configured to execute control logic and to control various processing operations, including to generate the model view 104, apply the set of speed settings 120, and perform other actions. Other configurations of the modeling platform 100, associated network connections, and other hardware, software, and service resources are possible.

The foregoing description is illustrative, and variations in configuration and implementation may occur to persons skilled in the art. For example, while implementations have been described in which the speed tool 110 is configured to set a set of speed settings 120, in implementations, the speed tool 110 may in addition set other values or parameters, such as zoom values or others. For further example, while embodiments have been described in which the geological structure and/or other formation or object is analyzed using a single model engine 102, it will be appreciated that in implementations, multiple models, engines, and/or representations may be used to analyze that object. Other resources described as singular or integrated may in embodiments be plural or distributed, and resources described as multiple or distributed may in embodiments be combined.

The foregoing description of the present disclosure, along with its associated embodiments and examples, has been presented for purposes of illustration only. It is not exhaustive and does not limit the present disclosure to the precise form disclosed. Those skilled in the art will appreciate from the foregoing description that modifications and variations are possible in light of the above teachings or may be acquired from practicing the disclosed embodiments.

For example, the same techniques described herein with reference to the operating and/or processor system may be used to execute programs according to instructions received from another program or from another processor system altogether. Similarly, commands may be received, executed, and their output returned entirely within the processing and/or memory of the operating and/or processor system.

Accordingly, neither a visual interface command terminal nor any terminal at all is strictly necessary for performing the described embodiments.

Likewise, the steps described need not be performed in the same sequence discussed or with the same degree of separation. Various steps may be omitted, repeated, combined, or divided, as necessary to achieve the same or similar objectives or enhancements. Accordingly, the present disclosure is not limited to the above-described embodiments, but instead is defined by the appended claims in light of their full scope of equivalents. Further, in the above description and in the below claims, unless specified otherwise, the term "execute" and its variants are to be interpreted as pertaining to any operation of program code or instructions on a device, whether compiled, interpreted, or run using other techniques.

What is claimed is:

1. A method of navigating a geological model, comprising:
    accessing a model engine to generate a view of the geological model;
    identifying a set of speed settings for navigating the view of the geological model based on at least one characteristic of the view of the geological model, wherein the set of speed settings comprises a speed curve indicating a speed of the navigating as a function of a histogram value, and wherein the at least one characteristic:
        comprises at least one of:
            a brightness value for a pixel or voxel of the view,
            a color value for a pixel or voxel of the view, or
            an intensity value for a pixel or voxel of the view; and
        is encoded in a histogram;
    receiving user input for navigating the view of the geological model; and
    controlling a speed of the navigating based at least partially on the set of speed settings and a value of the at least one characteristic at a user-selected location in the view.

2. The method of claim 1, wherein the view of the geological model comprises at least one of a two-dimensional view or a three-dimensional view.

3. The method of claim 1, wherein the set of speed settings comprises a reduction in the speed as the histogram value decreases.

4. The method of claim 1, wherein the user input comprises at least one of:
    user-controlled cursor input,
    touchpad input, or
    keyboard input.

5. The method of claim 1, wherein identifying the set of speed settings comprises normalizing a distribution of histogram bins.

6. The method of claim 1, wherein identifying the set of speed settings based on the at least one characteristic of the view of the geological model comprises increasing a speed of a cursor while the cursor is located in regions of the view with lower characteristic values.

7. The method of claim 1, wherein identifying the set of speed settings based on the at least one characteristic of the view of the geological model comprises decreasing a speed of a cursor while the cursor is located in regions of the view with higher characteristic values.

8. A system, comprising:
    an interface to a display configured to display a view of a geological model; and
    a processor, communicating with the display via the interface, the processor being configured to:
        identify a set of speed settings for navigating the view of the geological model based on at least one characteristic of the view of the geological model, wherein the set of speed settings comprises a speed curve indicating a speed of the navigating as a function of a histogram value, and wherein the at least one characteristic:
            comprises at least one of:
                a brightness value for a pixel or voxel of the view,
                a color value for a pixel or voxel of the view, or
                an intensity value for a pixel or voxel of the view; and
            is encoded in a histogram,
        receive user input for navigating the view of the geological model; and
        control a speed of the navigating based at least partially on the set of speed settings and a value of the at least one characteristic at a user-selected location in the view.

9. The system of claim 8, wherein the view of the geological model comprises at least one of a two-dimensional view or a three-dimensional view.

10. The system of claim 8, wherein the set of speed settings comprises a reduction in the speed as the histogram value decreases.

11. The system of claim 8, wherein the user input comprises at least one of:
    user-controlled cursor input,
    touchpad input, or
    keyboard input.

12. The system of claim 8, wherein identifying the set of speed settings comprises normalizing a distribution of histogram bins.

13. The system of claim 8, wherein identifying the set of speed settings based on the at least one characteristic of the view of the geological model comprises increasing a speed of a cursor while the cursor is located in regions of the view with lower characteristic values.

14. The system of claim 8, wherein identifying the set of speed settings based on the at least one characteristic of the view of the geological model comprises decreasing a speed of a cursor while the cursor is located in regions of the view with higher characteristic values.

15. A computer program product stored in one or more non-transitory computer-readable media, the computer program product comprising computer executable instructions that, when executed, cause a processor to perform operations comprising:
    accessing a model engine to generate a view of a geological model;
    identifying a set of speed settings for navigating the view of the geological model based on at least one characteristic of the view of the geological model, wherein the set of speed settings comprises a speed curve indicating a speed of the navigating as a function of a histogram value, and wherein the at least one characteristic:
        comprises at least one of:
            a brightness value for a pixel or voxel of the view,
            a color value for a pixel or voxel of the view, or
            an intensity value for a pixel or voxel of the view; and
        is encoded in a histogram;
    receiving user input for navigating the view of the geological model; and controlling a speed of the navigating based at least partially on the set of speed settings and a value of the at least one characteristic at a user-selected location in the view.

16. The computer program product of claim 15, wherein the view of the geological model comprises at least one of a two-dimensional view or a three-dimensional view.

17. The computer program product of claim 15, wherein the set of speed settings comprises a reduction in the speed as the histogram value decreases.

18. The computer program product of claim 15, wherein the user input comprises at least one of:
   user-controlled cursor input,
   touchpad input, or
   keyboard input.

19. The computer program product of claim 15, wherein identifying the set of speed settings comprises normalizing a distribution of histogram bins.

20. The computer program product of claim 15, wherein identifying the set of speed settings based on the at least one characteristic of the view of the geological model comprises at least one of:
   increasing a speed of a cursor while the cursor is located in regions of the view with lower characteristic values, or
   decreasing a speed of a cursor while the cursor is located in regions of the view with higher characteristic values.

* * * * *